(12) United States Patent
Ammann et al.

(10) Patent No.: US 10,801,543 B2
(45) Date of Patent: Oct. 13, 2020

(54) PLAIN BEARING WITH HYDRODYNAMIC AXIAL SECURING

(71) Applicant: ABB Schweiz AG, Baden (CH)

(72) Inventors: Bruno Ammann, Aarau (CH); Christian Kreienkamp, Bad Säckingen (DE); Antje Hertel, Ehrendingen (CH); Philippe Achtnich, Mägenwil (CH)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 16/484,441

(22) PCT Filed: Feb. 6, 2018

(86) PCT No.: PCT/EP2018/052968
§ 371 (c)(1),
(2) Date: Aug. 7, 2019

(87) PCT Pub. No.: WO2018/146101
PCT Pub. Date: Aug. 16, 2018

(65) Prior Publication Data
US 2020/0096039 A1      Mar. 26, 2020

(30) Foreign Application Priority Data
Feb. 8, 2017    (DE) .................. 10 2017 102 420

(51) Int. Cl.
*F16C 17/02* (2006.01)
*F16C 33/10* (2006.01)
(Continued)

(52) U.S. Cl.
CPC ............ *F16C 17/02* (2013.01); *F01D 25/166* (2013.01); *F16C 33/106* (2013.01); *F16C 35/02* (2013.01);
(Continued)

(58) Field of Classification Search
CPC ........ F16C 17/02; F16C 33/106; F16C 35/02; F16C 2360/40; F01D 25/166; F02C 6/12; F05D 2220/40
(Continued)

(56) References Cited

U.S. PATENT DOCUMENTS

| 4,348,065 A | 7/1982 | Yoshioka et al. |
| 5,207,566 A | 5/1993 | Munkel et al. |

(Continued)

FOREIGN PATENT DOCUMENTS

| CN | 204755000 U | 6/2015 |
| DE | 3025876 A1 | 2/1981 |

(Continued)

OTHER PUBLICATIONS

Written Opinion for PCT/EP2018/052968, dated Jun. 11, 2018, 10 pages, English language translation included.

(Continued)

*Primary Examiner* — Marcus Charles
(74) *Attorney, Agent, or Firm* — Barnes & Thornburg LLP

(57) ABSTRACT

A radial bearing arrangement of an exhaust gas turbocharger for mounting a shaft in a bearing housing is disclosed. The radial bearing arrangement comprises a radial bearing bush arranged between the shaft and the bearing housing, wherein the radial bearing bush features a radially outwardly projecting collar, which interacts in the axial direction with an axial stop on the bearing housing. The geometry of the radially outwardly projecting collar is interrupted by cutouts, such that a force acting on the collar as a result of an oil feed pressure is minimized, and wherein the radial bearing bush is configured such that a lubricating film can form between an end surface of the radial bearing bush and a counterpiece arranged on the shaft.

20 Claims, 4 Drawing Sheets

(51) Int. Cl.
*F16C 35/02* (2006.01)
*F01D 25/16* (2006.01)

(52) U.S. Cl.
CPC ...... *F05D 2220/40* (2013.01); *F16C 2360/24* (2013.01)

(58) Field of Classification Search
USPC ........ 384/275, 286, 322, 416, 906; 415/104, 415/229
See application file for complete search history.

(56) References Cited

U.S. PATENT DOCUMENTS

| | | | | |
|---|---|---|---|---|
| 5,659,445 | A * | 8/1997 | Yoshida | F16C 17/026 310/90 |
| 8,672,610 | B2 * | 3/2014 | Berger | F01D 25/16 415/104 |
| 8,857,180 | B2 * | 10/2014 | Begin | F01D 25/166 123/41.31 |
| 9,528,389 | B2 * | 12/2016 | Koerner | F01D 25/16 |
| 9,810,231 | B2 * | 11/2017 | Daguin | F01D 25/162 |
| 2010/0129212 | A1 * | 5/2010 | Berger | F16C 17/047 415/229 |
| 2010/0163215 | A1 * | 7/2010 | Li | F04D 13/06 165/120 |
| 2014/0369820 | A1 * | 12/2014 | Koch | F02B 37/00 415/170.1 |

FOREIGN PATENT DOCUMENTS

| | | |
|---|---|---|
| DE | 3537449 A1 | 1/1987 |
| DE | 8529861.1 U1 | 8/1987 |
| DE | 4002583 C1 | 5/1991 |
| DE | 102007025202 A1 | 12/2008 |
| JP | 4-95629 U | 8/1992 |
| WO | 2008/056002 A2 | 5/2008 |

OTHER PUBLICATIONS

International Search Report for PCT/EP2018/052968, dated Jun. 11, 2018, 8 pages, English language translation included.
Search Report for DE 10 2017 102 420.4 dated Dec. 21, 2017, 14 pages, English language translation included.

\* cited by examiner

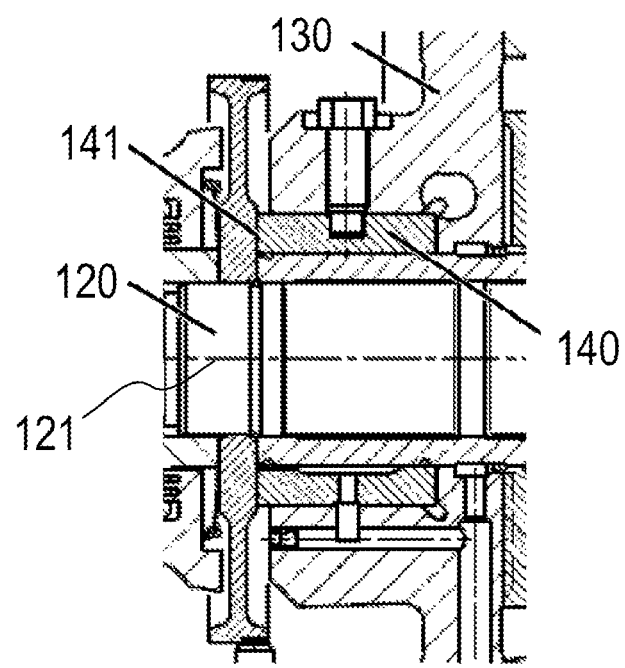
(Fig. 6) (Prior art)

PLAIN BEARING WITH HYDRODYNAMIC AXIAL SECURING

CROSS-REFERENCE TO RELATED APPLICATIONS

This application is a U.S. national stage of International Application Serial No. PCT/EP2018/052968, filed Feb. 6, 2018, which claims priority to German Patent Application No. 102017102420.4, filed Feb. 8, 2017. The entire disclosures of both of the foregoing applications are hereby incorporated by reference.

TECHNICAL FIELD

The invention relates to the field of exhaust gas turbochargers for supercharged internal combustion engines. In particular, the invention relates to a radial bearing arrangement of an exhaust gas turbocharger for mounting a shaft in a bearing housing, which radial bearing arrangement features a means for locking a radial slide bearing bush against axial displacement.

TECHNICAL BACKGROUND

Turbochargers for large engines are configured with slide or roller bearings. Modern turbochargers are equipped with hydrodynamic slide bearings that are typically supplied through the engine lubrication oil system. In this case, distinction is made between bearing parts for the axial bearing (absorbing the compressor and turbine thrust) and bearing parts for the radial bearing (guiding the shaft and absorbing as well as damping the shaft movement in the radial direction).

In the case of turbochargers, axial forces act on the turbine wheel and on the compressor wheel, which lead to a total axial force acting on the shaft of the turbocharger. In particular, in the case of axial turbines, this total axial force is absorbed by a thrust bearing. The thrust bearing is placed on the shaft of the turbocharger between the compressor wheel and the turbine wheel and comprises a thrust bearing arrangement co-rotating with the shaft and a stationary thrust bearing body as counterpiece to the thrust bearing arrangement. The thrust bearing is realized as a slide bearing between the co-rotating thrust bearing arrangement and the stationary thrust bearing body.

To improve the dynamics of the rotor of the exhaust gas turbocharger comprising the turbine wheel, the compressor wheel and the shaft as well as co-rotating bearing parts, the bearing bushes of the radial bearings are often installed in the bearing housing not firmly, but in floating fashion, with radial play. This arrangement is denominated trapped oil damper. In order to prevent a possible co-rotation of the bearing bush with the shaft mounted therein, a positioning is needed, but one which allows movement in the radial play. This positioning is effected in conventional exhaust gas turbochargers, for example, by means of stud bolts screwed into the bearing housing and corresponding boreholes in the radial bearing bush. FIG. 6 shows such an arrangement according to the prior art, as widely used. The end surfaces of the radial bearing bushes can be designed as axial bearings. In the example shown in FIG. 6, the auxiliary axial bearing is integrated in the radial bearing bush. The auxiliary axial bearing absorbs the forces counter to the main thrust direction. The force of the auxiliary bearing surface, designed with an optional profile, is transmitted at the opposite end surface of the radial bearing bush to the bearing housing.

The radial slide bearing parts are accordingly generally locked against axial displacement, to allow them to reliably perform their function. This can be effected, for example, by means of a stop in the housing or by means of dedicated locking elements, such as circlips or radial locking screws, which also function as rotational locking means at the same time.

STATEMENT OF THE TECHNICAL PROBLEM

The radial bearings with an axial locking means known from the prior art exhibit certain disadvantages in respect of their assembly and costs. The objective of the present invention is therefore to provide a radial bearing with an axial locking means which has been improved in this respect, i.e. is designed to be as cost-effective and easy to assemble as possible. In particular, the lack of accessibility in the modern design, with the mounting of the radial bearing integrated in the bearing housing, makes it impossible to mount radial locking elements. To minimize the axial installation length of the turbocharger and to make optimum use of the available installation space, it is advantageous to omit axial locking elements such as circlips. Axial displacement of the slide bearings should be avoided despite the omission of mechanical locking elements.

SUMMARY OF THE INVENTION

According to one aspect of the invention, a radial bearing arrangement of an exhaust gas turbocharger for mounting a shaft in a bearing housing is provided. The radial bearing arrangement comprises a radial bearing bush arranged between the shaft and the bearing housing. The radial bearing bush features a radially outwardly projecting collar that interacts in the axial direction with an axial stop on the bearing housing. The geometry of the radially outwardly projecting collar is interrupted by cut-outs, such that a force acting on the collar as a result of an oil feed pressure is minimized, wherein the radial bearing bush is configured such that a lubricating film can form between an end surface of the radial bearing bush and a counterpiece arranged on the shaft, in particular a rotating counterpiece. Here, the end surface of the radial bearing bush as well as the rotating counterpiece can be executed without profiling as well as with profiling. Profiling is advantageously dispensed with if the necessary level of the hydrodynamic restoring force can be attained even without profiling.

Thus, the radial bearing arrangement as invented provides a radial bearing arrangement in which the radial bearing bush advantageously need not be locked against radial displacement by means of a mechanical element, as is common in the prior art. The geometry of the radial bearing bush as well as the distances to the adjacent component parts are instead designed so that the oil pressure distribution around the radial bearing bush results in a defined force distribution that ensures that the radial bearing bush cannot uncontrollably move from its designated position and does not come in contact with rotating parts, which could cause wear. According to the embodiments of the invention described herein, this is achieved purely through the reciprocal action between oil feed pressure and hydrodynamic bearing force, without making use of mechanical stops or locking elements. Accordingly, the radial bearing arrangement as invented is advantageously designed to be cost-effective and easy to assemble, which ensures a defined axial position of the radial bearing bush and manages without additional components and additional installation space.

According to another aspect of the invention, an exhaust gas turbocharger with a radial bearing arrangement according to one of the embodiments described herein is provided for mounting a shaft in a bearing housing, such that an improved exhaust gas turbocharger can advantageously be provided.

Another aspect of the invention relates to the use of a radial bearing arrangement according to one of the embodiments described herein for a turbocharger such that a lubricating film forms between a counterpiece, for example a thrust ring, arranged fixedly in terms of rotation on a shaft and an end surface of the radial bearing bush, which lubricating film pushes the radial bearing bush in the axial direction toward the axial stop arranged on the bearing housing.

BRIEF DESCRIPTION OF THE FIGURES

Hereinafter, the invention shall be elucidated with reference to exemplary embodiments illustrated in figures, from which further advantages and modifications emerge. In the Figures:

FIG. 6 shows a sectional view through a radial bearing according to the prior art, with a radial bearing bush locked by means of a positioning pin.

DETAILED DESCRIPTION OF THE FIGURES

Figure 1:
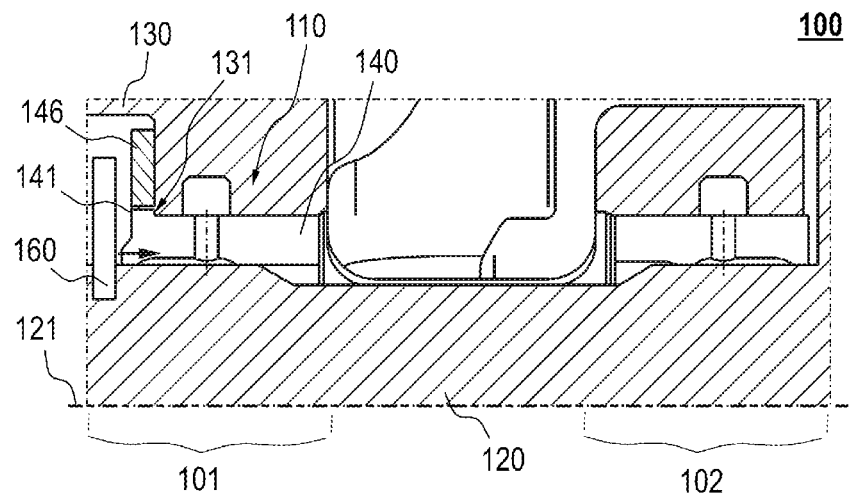
FIG. 1 shows a schematic cross-sectional view of a detail of a turbocharger with a radial bearing arrangement according to embodiments described herein.

In FIG. 1, a schematic cross-sectional view of a detail of a turbocharger 100 with a radial bearing arrangement 110 according to embodiments described herein is represented. In particular, FIG. 1 shows a radial bearing arrangement 110 of an exhaust gas turbocharger 100 for mounting a shaft 120 in a bearing housing 130. As shown in FIG. 1, the radial bearing arrangement 110 comprises, according to the present invention, a radial bearing bush 140 arranged between the shaft 120 and the bearing housing 130. The radial bearing bush 140 has a radially outwardly projecting collar 141, which interacts in the axial direction with an axial stop 131 on the bearing housing 130. During the assembly process, the radial bearing bush 140 is typically pushed axially into the bearing housing until the radially outwardly projecting collar 141 of the radial bearing bush 140 abuts on the bearing housing 130. In particular, the radial bearing bush 140 can be mounted in the bearing housing 130 such that the radial bearing bush 140 is static relative to a mounted, rotating shaft 120, i.e. does not co-rotate.

As illustrated in FIG. 1, the shaft 120 is rotatably mounted in the radial bearing. The radial bearing bush 140 is inserted in the bearing housing 130, which is typically arranged in exhaust gas turbochargers between the compressor and the turbine, with little radial play. A lubrication gap supplied with oil is arranged between the bearing housing and the outer periphery of the radial bearing bush. A circumferential oil supply channel is provided to ensure the oil supply along the periphery of the radial bearing bush. For assembly, the radial bearing bush 140 is, in the embodiment illustrated, inserted from the left into the opening in the bearing housing. Owing to the circumferential collar 141 projecting in the radial direction, the axial displaceability in the direction of insertion is limited. Furthermore, a metal plate 146 fastened on the bearing housing can be provided, which ensures rotational locking of the radial bearing bush by means of positive engagement with respect to the cam 143 (see FIG. 3).

Figure 3:
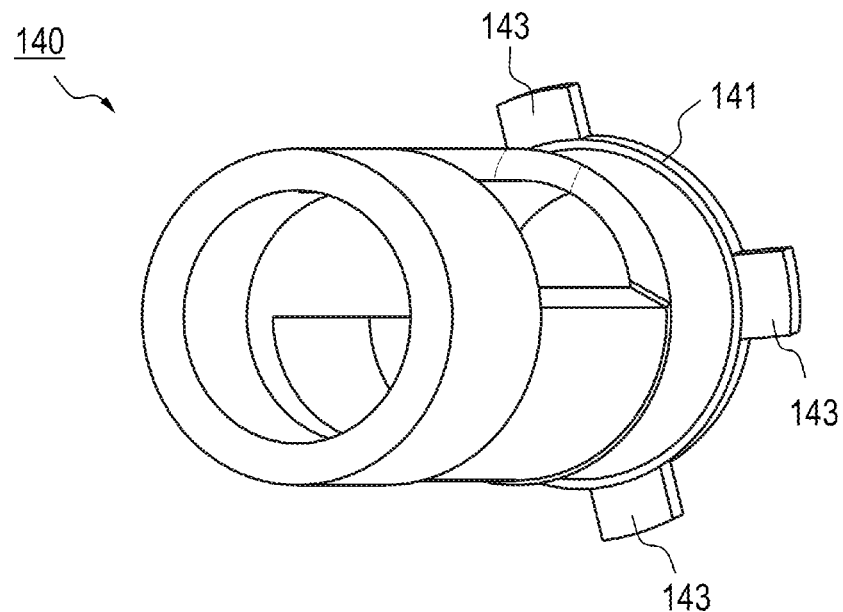
FIG. 3 shows an isometric view of a radial bearing bush of a radial bearing arrangement according to embodiments described herein.
Figure 4:
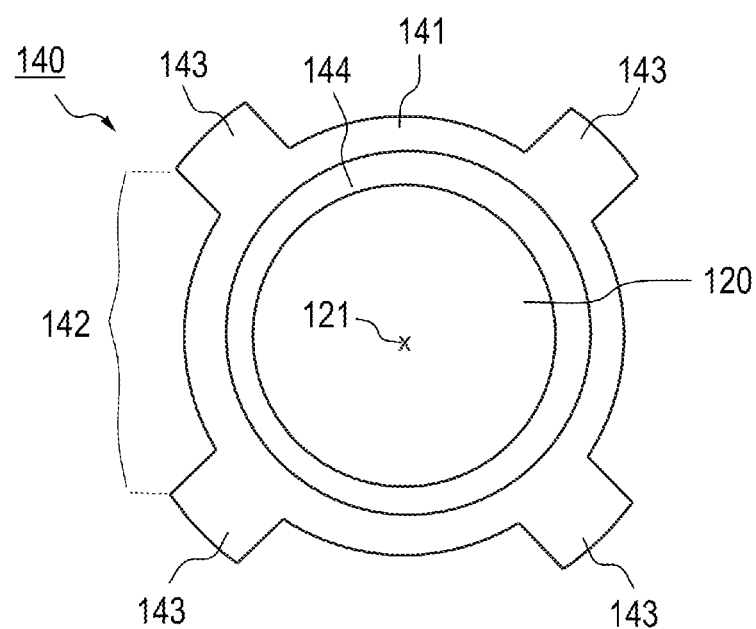
FIG. 4 shows a front view of a radial bearing bush of a radial bearing arrangement according to embodiments described herein.

As has been illustrated for example in FIGS. 3 and 4, the geometry of the radially outwardly projecting collar 141 of the radial bearing bush 140 is interrupted by cut-outs 142. Oil can flow off through these cut-outs, and so a force acting on the collar 141 as a result of an oil feed pressure can be minimized by means of the cut-outs 142. For example, by using the design of the radial bearing bush 140 as is represented in FIGS. 3 and 4, with a gap width of 0.3 mm of the radial play between radial bearing bush and bearing housing, it is possible for the force F acting as a result of an oil feed pressure to be reduced to F=26.8 N.

Figure 2:
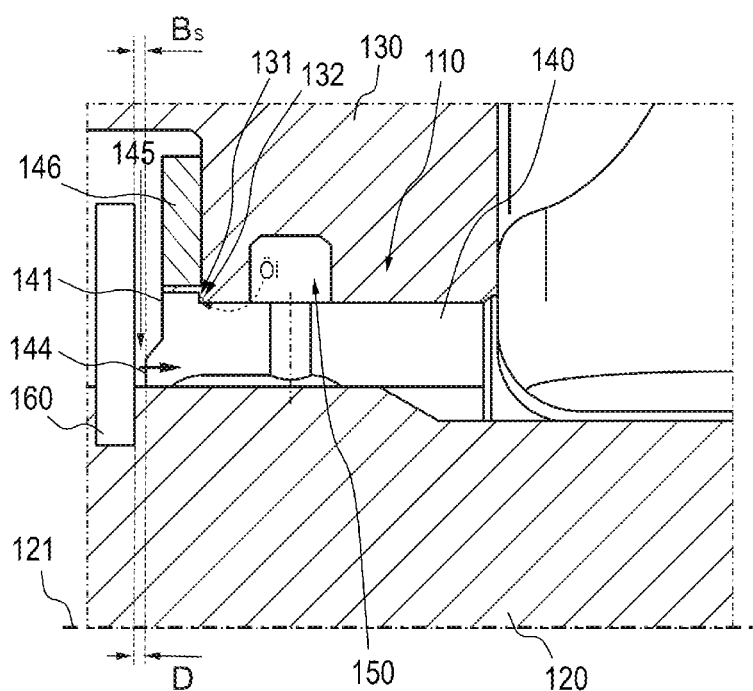
FIG. 2 shows a more detailed view of the schematic cross-sectional view of FIG. 1.

As is apparent from FIGS. 1 and 2, the radial bearing bush 140 is configured and arranged on the shaft 120 so that a lubricating film can form between an end surface 144 of the radial bearing bush 140 and a counterpiece 160, for example a thrust ring, arranged on the shaft 120. This lubricating film is supplied with oil from the radial bearing gap formed between the radial bearing bush 140 and the shaft 120.

Thus, the radial bearing arrangement as invented provides a radial bearing arrangement in which the radial bearing bush advantageously need not be locked against radial displacement by means of a mechanical element, as is common in the prior art. The geometry of the radial bearing bush as well as the distances to the adjacent component parts are instead designed so that the oil pressure distribution around the radial bearing bush results in a defined force distribution that ensures that the radial bearing bush cannot uncontrollably move from its designated position and does not come in contact with rotating parts, which could cause wear. According to the embodiments of the invention described herein, this is achieved purely through oil pressure, without making use of mechanical stops or locking elements.

As is apparent from the embodiments described herein, the radial bearing arrangement as invented is advantageously designed so that a lubricating film can form between the counterpiece 160, for example a thrust ring, and the radial bearing bush 140, which lubricating film counteracts an axial displacement of the radial bearing bush 140 in the direction of the compressor side 101. This is illustrated by way of example in the FIGS. 1 and 2 by an arrow, which points from the compressor side 101 to the turbine side 102. Accordingly, the radial bearing arrangement as invented is advantageously designed to be cost-effective and easy to assemble, which ensures a defined axial position of the radial bearing bush and manages without additional components and additional installation space.

Accordingly, the radial bearing arrangement according to the embodiments described herein exhibits distinctly lower axial forces than designs known from the prior art. In particular, it may be noted that the larger the axial gap between the radial bearing bush 140 and bearing housing 130 becomes, the lower the pressure force on the radial bearing bush 140, which pushes the radial bearing bush 140 away from the axial stop 131 of the bearing housing 130 (to the left in FIGS. 1 and 2), becomes.

A lubricating film forms between the rotating counterpiece 160, for example a thrust ring, and the end surface of the radial bearing bush 140. The more strongly the radial bearing bush 140 is pushed by the oil feed pressure behind the stop collar toward the left (FIGS. 1 and 2), the smaller the gap 145 between the counterpiece 160 and the radial bearing bush 140, in particular the end surface 144 of the radial bearing bush 140, becomes. The smaller the gap 145 becomes, the greater the restoring force of the lubricating film between the counterpiece 160 and the radial bearing bush 140, which pushes the radial bearing bush 140 back to the right (see arrow in FIGS. 1 and 2), becomes. A force equilibrium sets in, whereby the axial displacement of the radial bearing bush 140 is limited and contact with the rotating counterpiece 160 in operation is avoided.

According to a further embodiment, which can be combined with other embodiments described herein, the geometry of the outwardly projecting collar 141 of the radial bearing bush 140 is interrupted by cut-outs 142 such that four cams 143 are formed between which oil can flow off, as exemplified in FIGS. 3 and 4. Alternatively, the geometry of the outwardly projecting collar 141 can also be interrupted by cut-outs in such a manner that fewer or more than four cams are formed, for example 2, 3, 5, 6, 7, 8 or more cams. As is exemplified in FIG. 4, the cams 143 (e.g. the four cams illustrated) can be arranged essentially rotationally symmetrically with respect to the axis of rotation 121 of the shaft 120. The cams can also serve, for example, to lock the radial bearing bush against rotation relative to the bearing housing, for example by means of the metal plate 146 attached to the bearing housing, as described above. The radial bearing arrangement can, for example, be configured such that a positive connection is realized between the cams and the bearing housing.

As illustrated by way of example in the isometric view of the radial bearing bush 140 in FIG. 3, the radial bearing bush with the radially outwardly projecting collar 141 can be configured as a single piece as an integral component. This is conducive to making it possible to realize the radial bearing arrangement according to the embodiments described herein with as few components as possible.

According to a further embodiment that can be combined with other embodiments described herein, a gap 132 is provided between the radially outwardly projecting collar 141 and the bearing housing 130, which gap is designed to remove oil from an oil supply 150, as is represented by way of an example in FIG. 2. The gap 132 is typically designed to be radially circumferential as an oil supply gap.

As is shown in FIG. 2, the radial bearing arrangement 110 further features a counterpiece 160 that is arranged fixedly in terms of rotation on the shaft at a distance D from an axial end surface 144 of the radial bearing bush 140, such that a gap 145 is formed between the counterpiece 160, for example a thrust ring, and the axial end surface 144 of the radial bearing bush 140. The gap 145 between counterpiece 160 and radial bearing bush 140 is preferably chosen to be small enough that a lubricating film forms between counterpiece 160 and radial bearing bush 140, in particular the end surface 144 of the radial bearing bush 140, even at a small axial displacement (i.e. parallel to the axis of rotation 121 of the mounted shaft 120).

Typically, the distance D is selected such that the gap 145 has a gap width $B_S$ of 1 mm or less ($B_S \leq 1$ mm). For example, the gap can be $B_S = 0.55$ mm or less ($B_S \leq 0.55$ mm), in particular $B_S = 0.3$ mm or less ($B_S \leq 0.3$ mm), in particular $B_S = 0.1$ mm or less ($B_S \leq 0.1$ mm), for example $B_S \leq 0.05$ mm.

Figure 5:
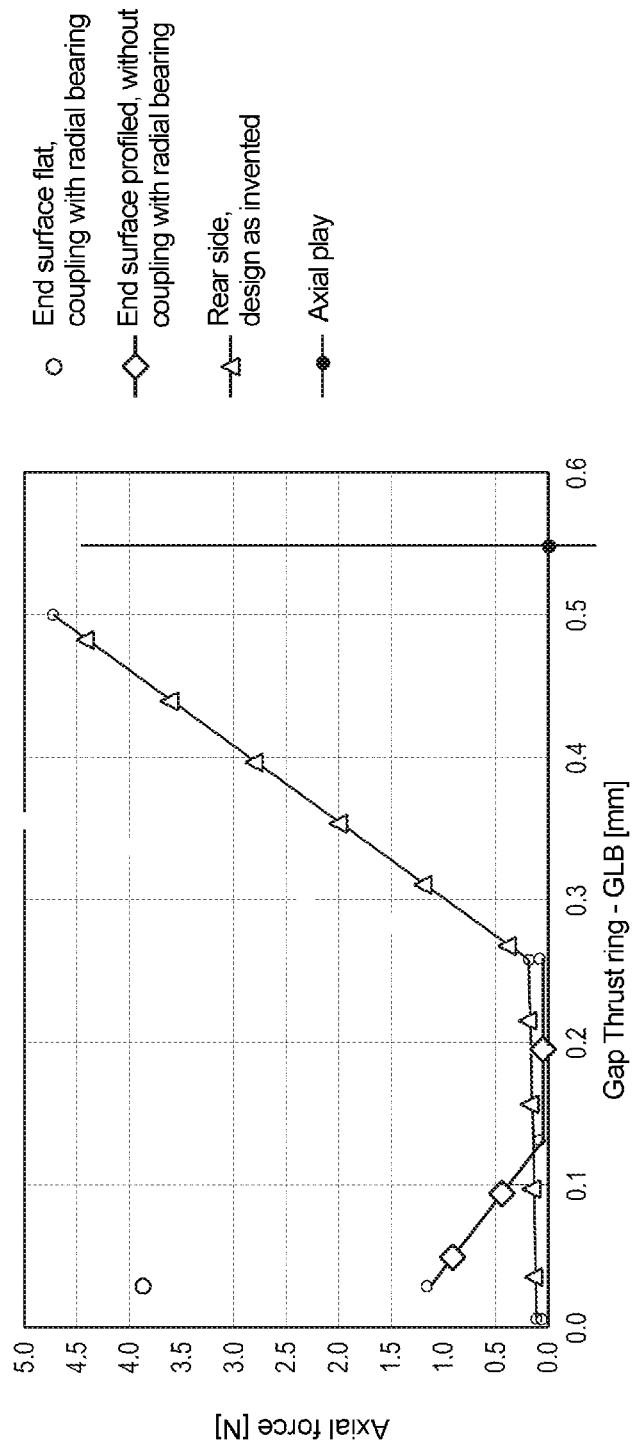
FIG. 5 shows a diagram in which the axially acting forces for an exemplary radial bearing arrangement according to embodiments described herein.

FIG. 5 shows a diagram in which the axially acting forces for an exemplary radial bearing arrangement according to embodiments described herein are illustrated. In detail, FIG. 5 shows the axial force on the end surface of the radial bearing bush 140 as well as the axial force on the rear side of the radial bearing bush 140 (in particular on the rear side of the collar of the radial bearing bush 140) as function of the gap between the counterpiece 160 and the end surface of the radial bearing bush 140 for different configurations of the radial bearing bush 140. The calculations were performed at an oil temperature of $T_{Öl} = 65°$ C. and at a rotational speed of 142 rps (rounds per second).

As is apparent from FIG. 5, the force F acting as a result of an oil feed pressure, i.e. the force acting on the rear side of the collar (radially outwardly projecting collar) of the radial bearing bush 140 can be reduced by means of the design of the radial bearing bush 140 as invented.

LIST OF REFERENCE NUMBERS

100 Turbocharger
101 Compressor side
102 Turbine side
110 Radial bearing arrangement
120 Shaft
121 Axis of rotation of the shaft
130 Bearing housing
131 Axial stop
132 Gap
140 Radial bearing bush
141 Collar of the radial bearing bush
142 Cut-outs
143 Cams
144 End surface
145 Gap
150 Oil supply

The invention claimed is:

1. A radial bearing arrangement of an exhaust gas turbocharger for mounting a shaft in a bearing housing, the radial bearing arrangement comprising:
    a radial bearing bush to be arranged between the shaft and the bearing housing, the radial bearing bush having a radially outwardly projecting collar configured to interact in an axial direction with an axial stop on the bearing housing;
    wherein the geometry of the collar is interrupted by cut-outs, such that a force acting on the collar as a result of an oil feed pressure is minimized; and
    wherein the radial bearing bush is configured such that a lubricating film forms between an end surface of the radial bearing bush and a counterpiece arranged on the shaft.

2. The radial bearing arrangement of claim 1, wherein the cut-outs in the geometry of the collar define four cams between which oil can flow off.

3. The radial bearing arrangement of claim 2, wherein the four cams are arranged rotationally symmetrically with respect to an axis of rotation of the shaft.

4. The radial bearing arrangement of claim 1, wherein the radial bearing bush with the collar is configured as a single integral component.

5. The radial bearing arrangement of claim 1, wherein a gap is provided between the radially outwardly projecting collar and the bearing housing, the gap being configured to remove oil from an oil supply.

6. The radial bearing arrangement of claim 1, wherein the counterpiece is a thrust ring arranged fixedly in terms of rotation on the shaft at a distance D from an axial end surface of the radial bearing bush, such that a gap is formed between the thrust ring and the axial end surface of the radial bearing bush.

7. The radial bearing arrangement of claim 6, wherein the distance D is selected so that the gap has a gap width less than or equal to 1 mm.

8. The radial bearing arrangement of claim 7, wherein the gap width is less than or equal to 0.55 mm.

9. The radial bearing arrangement of claim 7, wherein the gap width is less than or equal to 0.3 mm.

10. The radial bearing arrangement of claim 7, wherein the gap width is less than or equal to 0.1 mm.

11. An exhaust gas turbocharger comprising:
a bearing housing;
a shaft mounted in the bearing housing; and
a radial bearing bush arranged between the shaft and the bearing housing, the radial bearing bush having a radially outwardly projecting collar that interacts in an axial direction with an axial stop on the bearing housing;
wherein the geometry of the collar is interrupted by cut-outs, such that a force acting on the collar as a result of an oil feed pressure is minimized; and
wherein the radial bearing bush is configured such that a lubricating film forms between an end surface of the radial bearing bush and a counterpiece arranged on the shaft.

12. The radial bearing arrangement of claim 11, wherein the cut-outs in the geometry of the collar define four cams between which oil can flow off.

13. The radial bearing arrangement of claim 12, wherein the four cams are arranged rotationally symmetrically with respect to an axis of rotation of the shaft.

14. The radial bearing arrangement of claim 11, wherein the radial bearing bush with the collar is configured as a single integral component.

15. The radial bearing arrangement of claim 11, wherein a gap is provided between the radially outwardly projecting collar and the bearing housing, the gap being configured to remove oil from an oil supply.

16. The radial bearing arrangement of claim 11, wherein the counterpiece is a thrust ring arranged fixedly in terms of rotation on the shaft at a distance D from an axial end surface of the radial bearing bush, such that a gap is formed between the thrust ring and the axial end surface of the radial bearing bush.

17. The radial bearing arrangement of claim 16, wherein the distance D is selected so that the gap has a gap width less than or equal to 1 mm.

18. A method comprising:
forming a lubricating film between (i) a counterpiece arranged fixedly in terms of rotation on a shaft and (ii) an end surface of a radial bearing bush arranged between the shaft and a bearing housing; and
pushing, with the lubricating film, the radial bearing bush in an axial direction toward an axial stop arranged on the bearing housing.

19. The method of claim 18, wherein the radial bearing bush has a radially outwardly projecting collar that interacts in the axial direction with the axial stop.

20. The method of claim 19, further comprising minimizing a force acting on the collar as a result of an oil feed pressure using cut-outs that interrupt the geometry of the collar.

* * * * *